T. McCABE.
COVER ATTACHMENT.
APPLICATION FILED MAY 6, 1910.
987,087.
Patented Mar. 14, 1911.
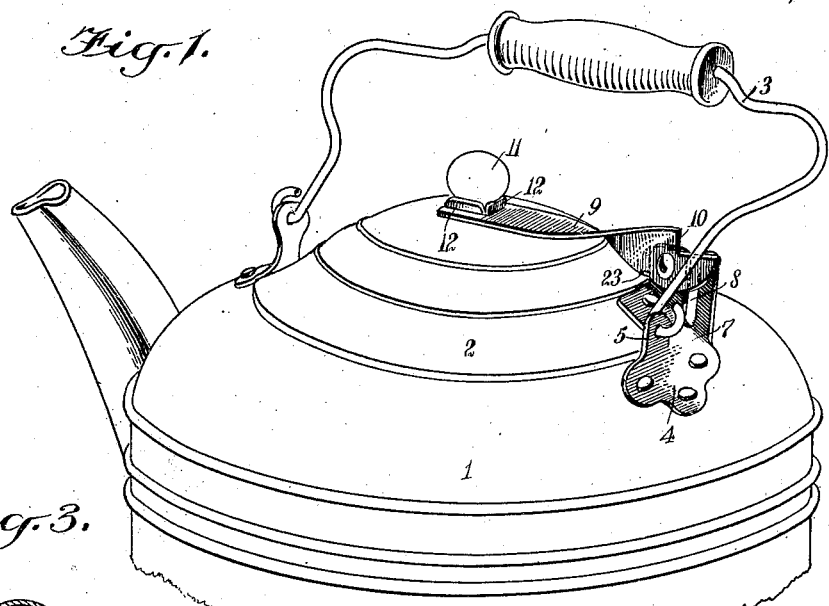
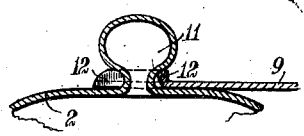
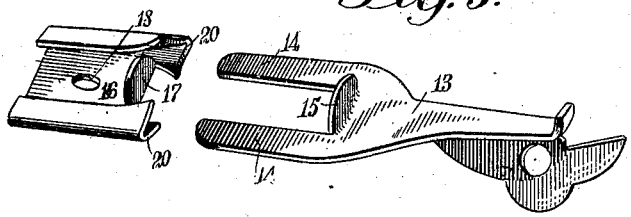
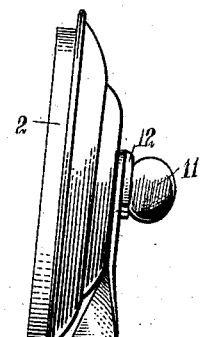
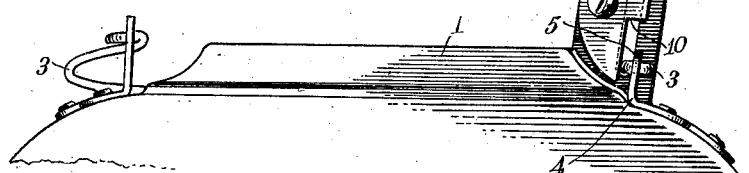
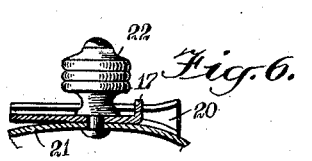
WITNESSES:
Geo. W. Naylor
P. A. Hoster
INVENTOR
Thomas McCabe
BY Munn & Co.
ATTORNEYS

UNITED STATES PATENT OFFICE.

THOMAS McCABE, OF HOMESTEAD, PENNSYLVANIA.

COVER ATTACHMENT.

987,087.  Specification of Letters Patent.  Patented Mar. 14, 1911.

Application filed May 6, 1910. Serial No. 559,764.

*To all whom it may concern:*

Be it known that I, THOMAS McCABE, a citizen of the United States, and a resident of Homestead, in the county of Allegheny and State of Pennsylvania, have invented a new and Improved Cover Attachment, of which the following is a full, clear, and exact description.

An object of my invention is to provide a cover attachment for use on kettles and like vessels provided with covers, to conveniently and automatically lift the cover off the vessel without soiling or injuring the fingers. For the purpose mentioned, I provide a bearing with a lever mounted thereon, the said bearing being adapted to be attached to a vessel and the said lever being adapted to engage the cover of the vessel by the knob, said cover being adapted to be disengaged from the vessel when the bail of the vessel engages the lever.

Reference is to be had to the accompanying drawings forming a part of this specification, in which similar characters of reference indicate corresponding parts in all the views, and in which—

Figure 1 is a partial perspective view of a vessel having my device applied thereto; Fig. 2 is a partial side view of a vessel showing the cover thereof disengaged from the vessel by my device; Fig. 3 is a fragmentary sectional side view of the connection between the lever of my device and the cover of the vessel; Fig. 4 is a perspective view of the securing member forming a part of a modified form of my invention; Fig. 5 is a similar view of a modified form of a lever constituting a part of my device; and Fig. 6 is a partial sectional side view of the connection between the cover of a vessel and the modified form of my invention.

Referring more particularly to the various figures, I provide a kettle 1, of any suitable design, and having thereon a cover 2 and a bail 3, such as are generally found on vessels of this class. On the vessel is secured a bearing 4 having a lug 5 adapted to constitute a bearing or holder for one end of the bail 3. The bearing 4 has an upwardly projecting lug 7 provided with a slot or guide 8, as will be seen by referring to Fig. 1. A lever 9 is pivotally mounted on the bearing 4, and provided with a notch 10 in one end of the lever. The other end of the lever engages the cover 2 intermediate the cover 2 and a knob 11 secured to the cover 2. Flanges or lugs 12 are formed on the lever 9 so as to assure a stronger and more feasible connection between the knob 11 and the lever 9.

When it is desired to raise the cover 2 from the vessel 1, the bail 3 is pressed down to engage the lever 9 at the notch 10 and, as will be easily seen in Fig. 2, the cover 2 is raised upwardly and away from the vessel 1. In view of the notch 10, the cover can be easily retained in its upright position, and when raising the bail the cover moves downwardly to reëngage the vessel 1.

In Figs. 4 and 5, I disclose a modified form of lever and securing means for connection therewith. This lever is preferably adapted for use on vessels where the knob of the cover is integral with the cover, and with this form of lever the cover can be quickly removed from the lever. The lever 13 comprises two forks 14, provided at their intersection with an upwardly-projecting flange 15. A securer 16 is provided having a flange 17, a hole 18 for the knob of the cover and side guides 20 for the reception of the forks 14, and the same is applied to a cover 21 having a knob 22, as shown in Fig. 6. In this manner the lever and cover can be disengaged at any time.

A lug 23 is provided on the lever 9, and when the lid 2 is not used the lug 23 engages a side of the bearing 4 and prevents the lever from falling into the kettle 1, at the same time holding the lever out of engagement with the bail 3.

It will be understood that although I have shown a particular form of vessel and attachment therefor, for the purpose of describing my invention, I do not limit myself to this construction, the scope of my invention being disclosed in the appended claims.

Having thus described my invention, I claim as new and desire to secure by Letters Patent—

1. A cover attachment comprising a bearing for attachment to a vessel, a lever mounted on the bearing and engaging the cover to lift the same when the bail of the vessel engages the lever and a slotted guide on the bearing for receiving and guiding the bail.

2. A cover attachment comprising a bearing for attachment to a vessel, a lever mounted on the bearing, and spaced forks on the lever for attachment to the handle of the cover to lift the same when the bail of the vessel engages the lever.

3. A cover attachment comprising a bearing for attachment to a vessel, a lever mounted on the bearing, spaced forks on the lever for attachment to the handle of the cover to lift the cover when the bail of the vessel engages the lever and a slotted guide on the bearing and adapted to receive and guide the said bail.

4. A cover attachment comprising a bearing for attachment to a vessel, a lever mounted on the bearing, spaced forks on the lever for attachment to the handle of the cover and means for adjustably securing the forks to the cover and removably adapted to slide on the forks.

In testimony whereof I have signed my name to this specification in the presence of two subscribing witnesses.

THOMAS McCABE.

Witnesses:
 THOS. H. LYNCH,
 JOHN McCABE.

Copies of this patent may be obtained for five cents each, by addressing the "Commissioner of Patents, Washington, D. C."